United States Patent [19]

Putney

[11] Patent Number: 5,381,757
[45] Date of Patent: Jan. 17, 1995

[54] PORTABLE LIVESTOCK CORRAL

[76] Inventor: Lloyd P. Putney, 1921 - 80th Ave., New Virginia, Iowa 50210

[21] Appl. No.: 103,530

[22] Filed: Aug. 9, 1993

[51] Int. Cl.⁶ .................................................. A01K 3/00
[52] U.S. Cl. ........................................ 119/20; 256/26; 119/840; 119/843
[58] Field of Search ................ 119/20, 843, 848, 849, 119/840; 256/26, DIG. 2

[56] References Cited

U.S. PATENT DOCUMENTS

| | | | |
|---|---|---|---|
| 42,166 | 4/1864 | Clapp et al. | 256/26 |
| 134,624 | 1/1873 | Anderson | 256/26 |
| 1,633,619 | 6/1927 | Ward | 256/26 |
| 3,741,529 | 6/1973 | Blagg | 256/26 |
| 4,145,994 | 3/1979 | Miller | 119/840 |
| 4,201,157 | 5/1980 | Lambert . | |
| 4,366,775 | 1/1983 | Tyquin | 119/848 |
| 4,569,309 | 2/1986 | Wilson et al. | 119/20 |
| 4,619,223 | 10/1986 | Koehn . | |
| 4,821,679 | 4/1989 | Hackert | 119/20 |
| 4,924,813 | 5/1990 | Bixler et al. . | |
| 5,115,763 | 5/1992 | Wilson . | |

FOREIGN PATENT DOCUMENTS 2441046  7/1980  France ................................ 256/26

*Primary Examiner*—Todd E. Manahan
*Attorney, Agent, or Firm*—Henderson & Sturm

[57] ABSTRACT

A portable, collapsible livestock corral utilizes a unique two-axis hinge mechanism at the intersection of each of the corral panels making it particularly suitable for use on uneven and/or rough terrain. A winch mechanism is used to facilitate the positioning of the panel units and when making the invention ready for transportation. Double hinged gate panels allow the invention to be conveniently positioned for the entry and exit of livestock into the corral.

6 Claims, 4 Drawing Sheets

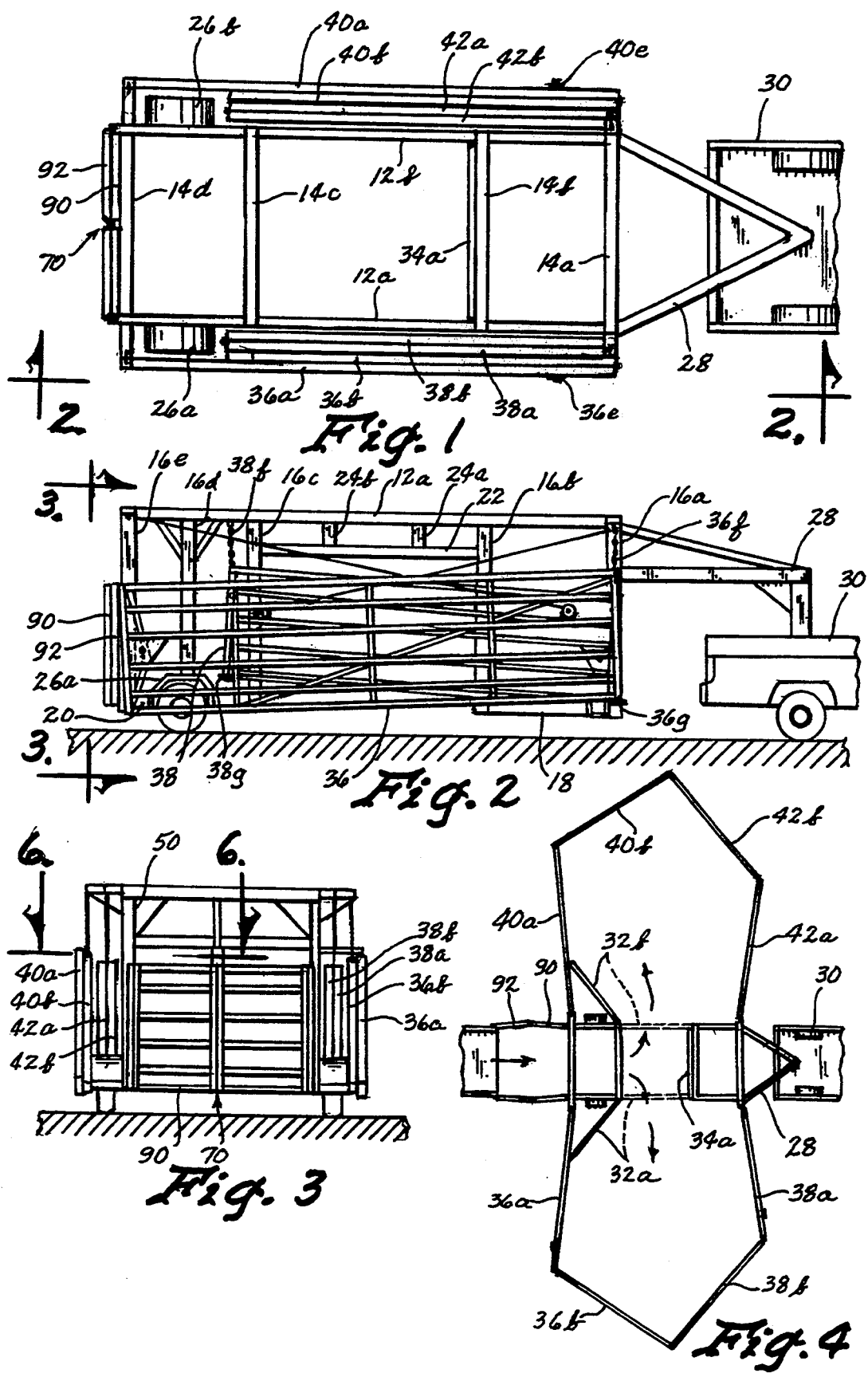

PORTABLE LIVESTOCK CORRAL

TECHNICAL FIELD

This invention relates to livestock pens and corrals, and more particularly to a portable livestock corral which may be easily reconfigured for various uses or for transportation to another site.

BACKGROUND ART

Cattle and other livestock are often moved between various locations by truck or trailer and a need exists for confining these animals before and after unloading. Often times permanent corrals or pens are not available and it is necessary to utilize some sort of temporary structure. Numerous devices have been developed which attempt to fill this need, but most of these are rather complex structures which utilize rollers or wheels to support the structure walls and are therefore less than optimum for use on rough or uneven terrain.

DISCLOSURE OF THE INVENTION

The present invention discloses a portable, collapsible livestock corral utilizing a novel two-axis hinge mechanism at the intersection of each of the corral panels which makes it particularly suitable for use on uneven and/or rough terrain. A winch mechanism is used to facilitate the positioning of the panel units and when making the invention ready for transportation. Double hinged gate panels allow the invention to be conveniently positioned for the entry and exit of livestock into the corral.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a top plan view of the invention configured for towing;

FIG. 2 is a side elevational view of the invention configured for towing;

FIG. 3 is a rear elevational view taken along line 3—3 of FIG. 2;

FIG. 4 is a top plan view of the invention in an unfolded configuration;

BEST MODE FOR CARRYING OUT THE INVENTION

Figure 5:
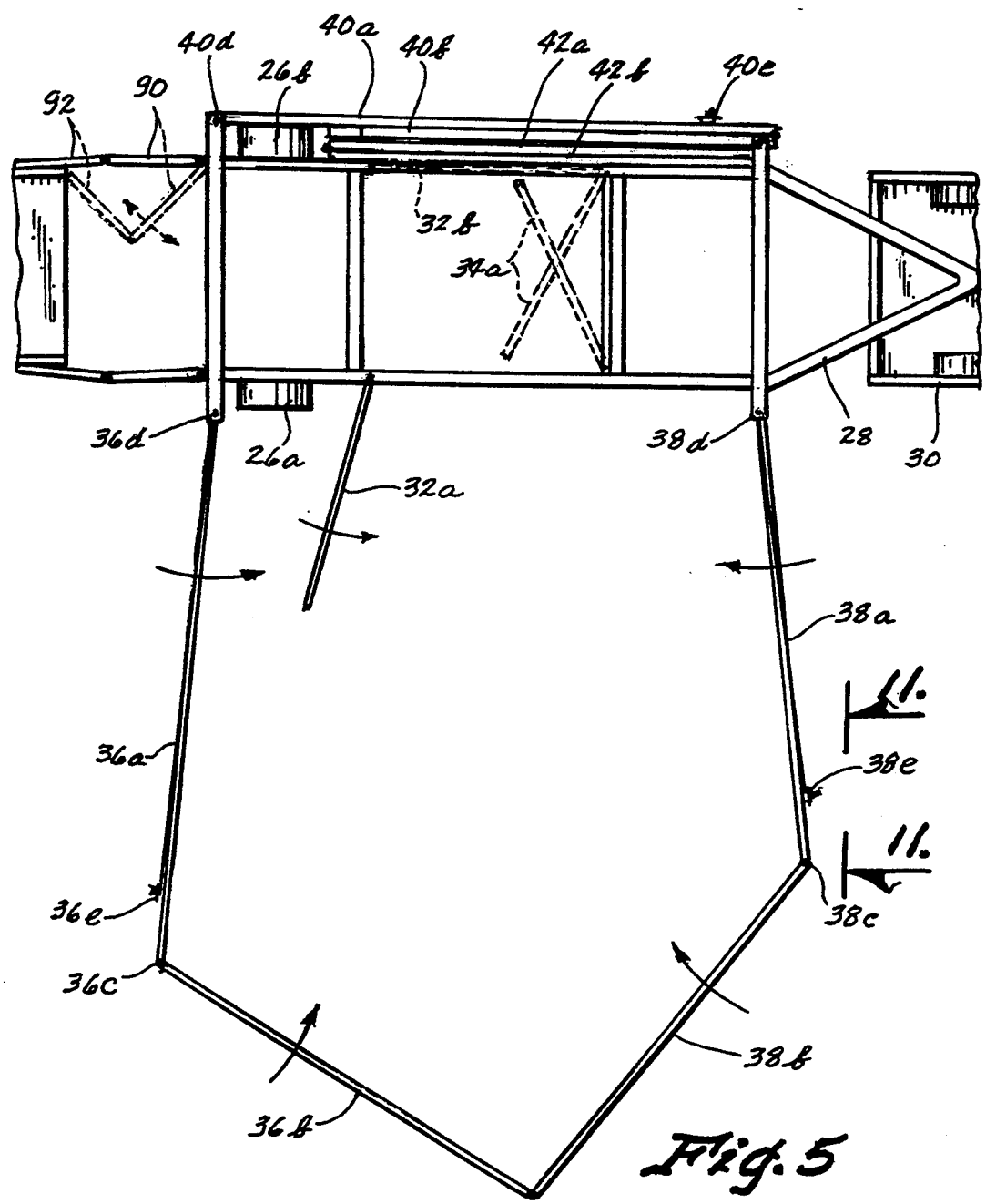
FIG. 5 is a top plan view with the left side of the invention folded, and the right side in an unfolded configuration.

Referring now to the drawings, wherein like reference numerals designate identical or corresponding parts throughout the several views, FIGS. 1, 2, and 3 depict the invention in the towing configuration. While many different base structures are possible, a preferred embodiment is depicted which is constructed of welded steel beams. A pair of upper, longitudinal beams 12a, 12b are welded to four upper crossbeams 14a, 14b, 14c, 14d. Five vertical support beams 16a, 16b, 16c, 16d, 16e extend from longitudinal beam 12a down to a forward beam 18 and a rear wheel support assembly 20. A truss member 22 is welded between vertical beams 16b and 16c to provide structural integrity between the forward and rearward sections of the base unit. This truss member 22 is also secured to upper beam 12a by means of a pair of short support beams 24a, 24b. An identical beam structure (not shown) is also present on the left side of the base unit.

A pair of wheels 26a, 26b support the rearward end of the invention so that it may be easily moved from one site to another. In the preferred embodiment, a gooseneck towbar assembly 28 is secured to the forward end of the invention which may be easily attached to a towing vehicle 30.

While not depicted in the Figures for the sake of clarity, a preferred embodiment of the invention would have several, perhaps five, horizontal bars extending between the two forward vertical beams 16a, 16b, and would also have perhaps five horizontal bars extending between the rear vertical beams 16c, 16e. Horizontal bars also pass between the two forward vertical beams 16a and its opposite counterpart not shown.

As is best depicted in FIG. 5, the invention is also equipped with a gate 32a which is pivotally attached to vertical beam 16c, and a second 32b which is pivotally attached to its respective vertical beam (not shown). These gates pivot from an open position (32a) to a closed position (32b) and serve to enclose the base unit so as to provide a small rectangular pen area which can be isolated from the larger areas to be described below.

Further depicted in FIG. 5 is a gate 34a which is pivotally and removably attached to either vertical beam 16b, or its counterpart on the opposite side of the base unit. A similar gate 34b is also pivotally and removably attached to vertical beam 16c, or its counterpart on the opposite side of the base unit. It may therefore be seen that these gates 32a, 32b, 34a, 34b offer a convenient means for providing three separate pens within the base unit for isolating different livestock.

Figure 11:
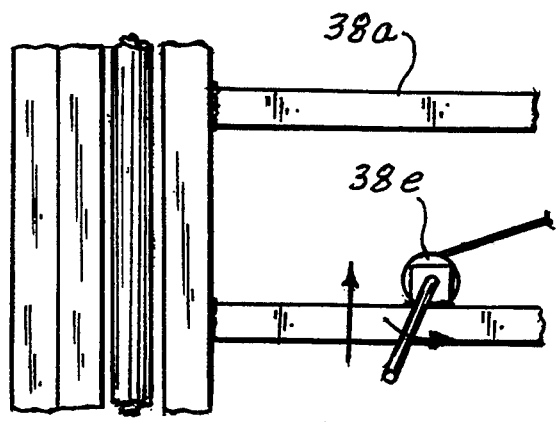
FIG. 11 is a view taken along line 11—11 of FIG. 5.

FIG. 4 is a top plan view showing the invention with the main corral sections 36, 38, 40, 42 in the unfolded position, while FIG. 5 depicts the right main corral sections 36, 38 in the unfolded position, and the left main corral sections 40, 42 in the stowed position. Each main corral section comprises two panels which are pivotally attached to each other. Referring to FIG. 5, it may be seen that to configure the invention for transportation, panel 38b is first pivoted about hinge point 38c until it is flush with panel 38a. This pivoting action is facilitated by the fact that hinge point 38c pivots about a horizontal as well a vertical axis as will be further described below. Therefore, in preparation for folding, panel 38b may first be raised off of the ground by pivoting it vertically about the horizontal axis of hinge point 38c. When so elevated, panel 38b may then be pivoted about the vertical axis of hinge point 38c until the panel is flush with panel 38a. Panel 38b is then lowered into a position parallel with panel 38a, and is held in this position by means of a chain-bar latch device (not shown) described below. The two-panel section may now be pivoted into the stowed position adjacent the base unit by pivoting it about hinge point 38d. Identical to hinge 38c, hinge point 38d also pivots about a horizontal as well as a vertical axis to facilitate stowing and to permit the invention to be used on rough or uneven terrain. Therefore, corral section 38 may be raised off of the ground by means of a winch and cable assembly 38e. The winch 38e is secured to panel section 38a near hinge point 38c (FIG. 11) with the end of the cable secured to an extension of crossbeam 14a. When the winoh is actuated, the corral section 38 is rotated about the horizontal axis of hinge point 38d and is elevated above the ground. The section may then be easily pivoted about the vertical axis of hingepoint 38d, and positioned adjacent the base unit. The section is then held in the elevated position adjacent the base unit by means of a second chain-bar latch device 38f. As seen in FIG. 2, one end of an ordinary chain is welded to beam 12a while the opposite end has a rod approximately three inches long welded thereto, perpendicular to the extended chain as it hangs down where it may engage a ring or short tube welded near hinge point 38c. When the rod and chain are slipped through the ring or short tube, the rod is then rotated so that the chain may not be withdrawn. The chain-bar latch then holds the corral section elevated and adjacent the base unit when the tension on the wench-cable assembly is released. A similar chain bar latch holds panel 38b next to panel 38a as mentioned above. While this discussion has focused primarily on corral section 38, it would be obvious to one skilled in the art that corral sections 36, 40 and 42 function in the same manner.

As seen in FIG. 5, the forward corral sections 38, 42 are somewhat shorter than the rear corral sections 36, 40 since they must fit forward of the wheels 26 when in the stowed position. The rear corral sections 36, 40 pivot on somewhat extended hinge points 36d, 40d and are stowed just outside the wheels 26 and the forward sections 38, 42.

Figure 6:
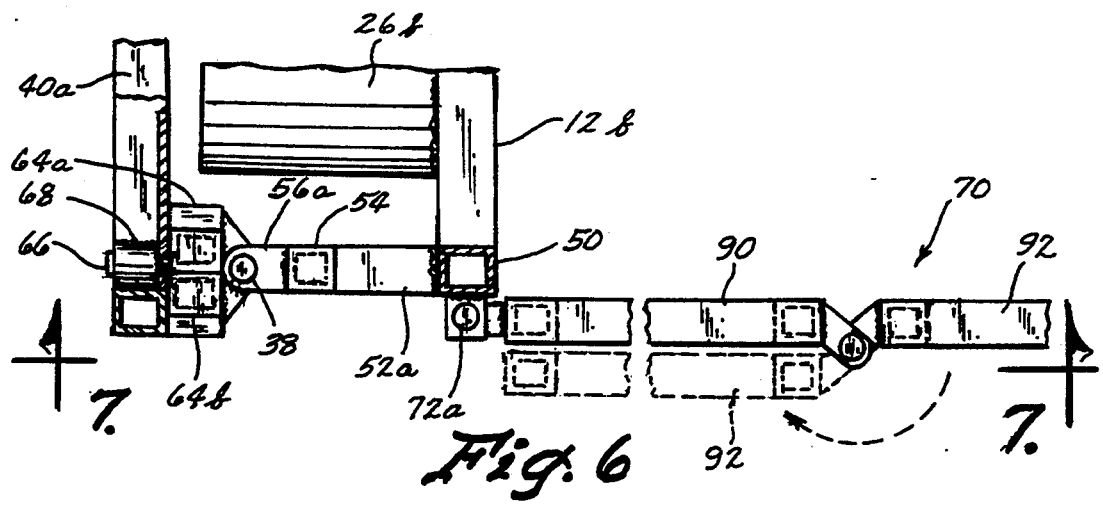
FIG. 6 is a top plan view of the left, rear of the invention depicting an inner panel hinge assembly and a double folding gate and is taken along line 6—6 of FIG. 3.
Figure 7:
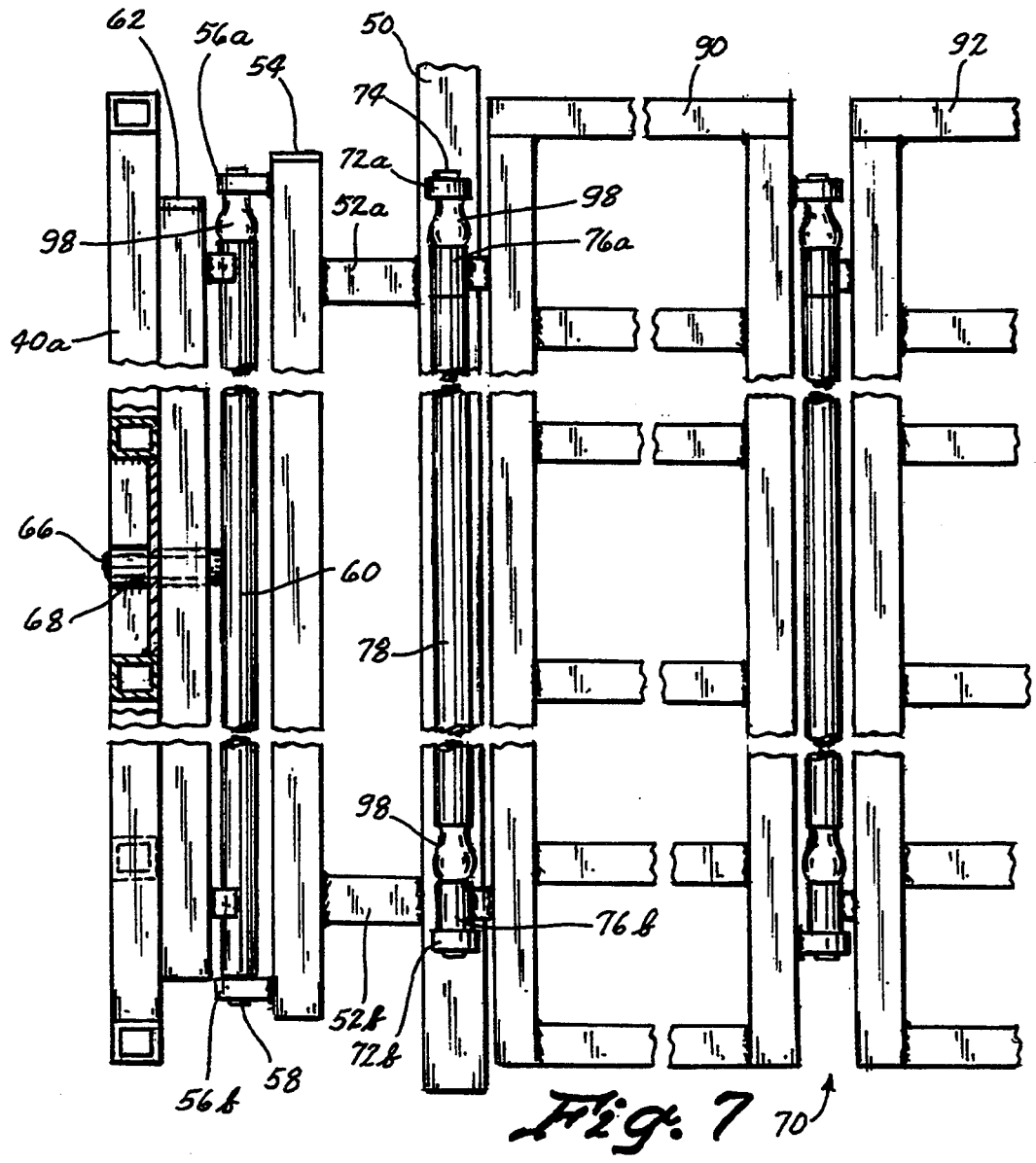
FIG. 7 is a rear elevational view taken along line 7—7 of FIG. 6
Figure 8:
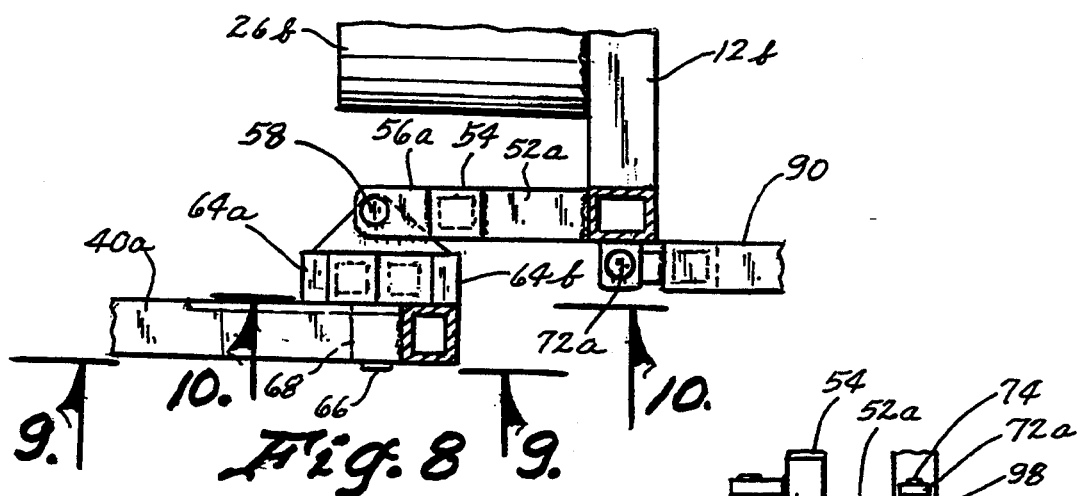
FIG. 8 is a top plan close-up view similar to FIG. 6 which depicts an inner panel hinge assembly in the open position.
Figure 9:
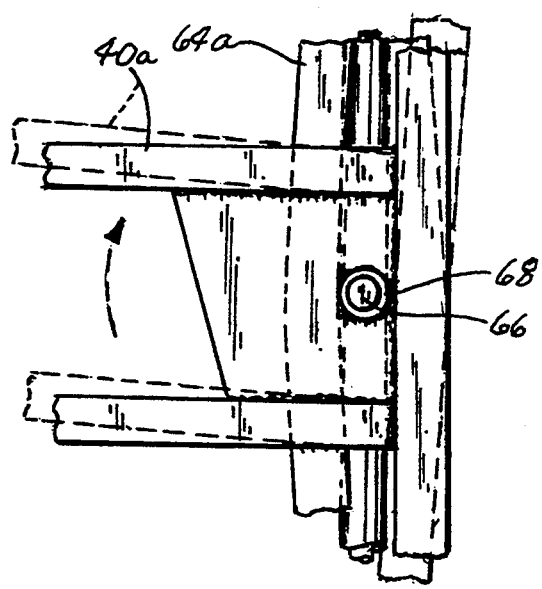
FIG. 9 is a view taken along line 9—9 of FIG. 8.
Figure 10:
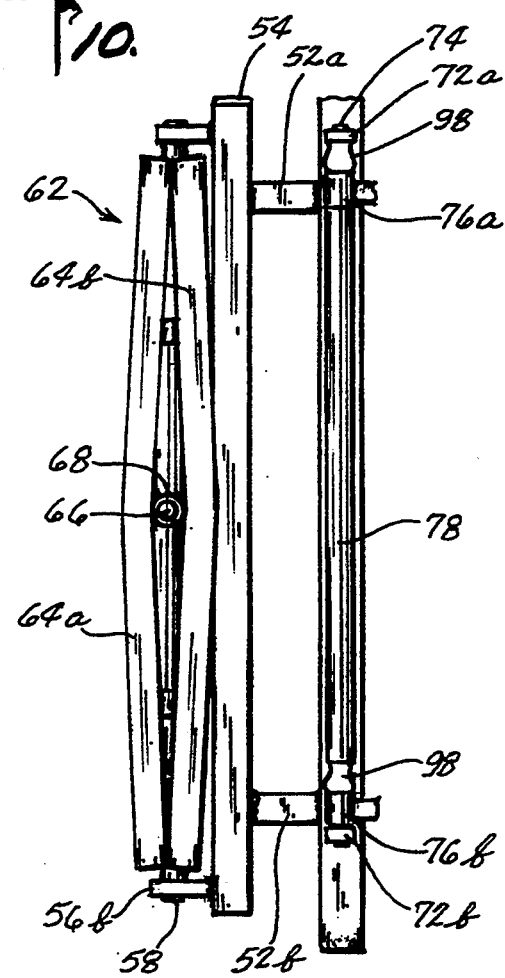
FIG. 10 is a view taken along line 10—10 of FIG. 8.

FIG. 6 and 7 depict left, rear hinge point 40d in the stowed position, while FIGS. 8, 9, and 10 depict the same hinge point in the open, extended position. A pair of horizontal support beams 52a, 52b extend laterally from the left rear vertical support beam 50 and attach to a hinge support beam 54. Extending laterally from hinge support beam 54 is a pair of hinge plates 56a, 56b which support hinge pin 58. Rotatably mounted on hinge pin 58 is hinge tube 60, which is free to pivot at least 90 degrees from the stowed position of FIGS. 6, 7 to the open position of FIGS. 8, 9, 10. Welded to hinge tube 60 is a pivot plate assembly 62 (FIG. 10), which is comprised of a pair of vertical beam members 64a, 64b which surround a pivot pin 66. Interior panel section 40a is provided with a pivot bearing 68, which is rotatably mounted upon its respective pivot pin 66, thus providing for vertical motion of the corral section 40. Also provided is a hinge pin rain cap 98 which fits upon the hinge pin 58 above the hinge tube 60. With its lower flared body, this rain cap 98 serves to inhibit rain from entering the hinge assembly and causing corrosion. The three other corral section hinge points are constructed in this same manner, as are the four panel hinge points.

FIG. 6 and 7 also depict the dual hinged gate system 70 of the invention. A pair of hinge plates 72a, 72b extend rearwardly from the left rear vertical support beam 50 which support hinge pin 74. Rotatably mounted upon hinge pin 74 is a pair of pivot bearings 76a, 76b which are in turn welded to first gate panel 90. Fitted upon hinge pin 74 is a pin cover tube 78, as well as a pair of hinge pin rain caps 98. As is obvious from FIG. 7, first panel 90 comprises a rectangular frame with a number of crossbars, preferably four, welded within. A second gate panel 92 is rotatably attached to first panel 90 with a hinge assembly identical to that just described. A second dual hinged gate system is attached to vertical support beam 16e which is the mirror image of the system just described. Thus, this pair of dual hinged gate systems provides an easily adjustable entry chute for the livestock which allows a great deal of flexibility when positioning a livestock truck near the invention.

Obviously, many modifications and variations of the present invention are possible in light of the above teachings. It is therefore to be understood that, within the scope of the appended claims, the invention may be practiced otherwise than as specifically described.

I claim:
1. A portable livestock corral, comprising:
   a base frame having a forward end a rearward end, a right side and a left side,
   said rearward end having wheels elevating the rearward end above the ground, and said forward end having goose neck towing means elevating the forward end above the ground; wherein said base frame defines both a longitudinal passageway and intersecting transverse passageway for livestock;
   enclosure means for controlling said transverse passageway and containing livestock comprising a first panel and a second panel pivotally connected to said first panel above both a horizontal axis and a vertical axis; and
   means for attaching the first panel to said base frame which permits relative motion about both a vertical and a horizontal axis.
2. The portable livestock corral as recited in claim 1 wherein said enclosure means has a ground engaging position and an elevated position, and means for pivoting said enclosure means between said positions about a horizontal axis.
3. The portable livestock corral as recited in claim 2 wherein said pivoting means comprises a winch and cable assembly.
4. The portable livestock corral as recited in claim 1, wherein, the rearward end of said base frame is provided with a double hinged entry gate forming an extension of said longitudinal passageway.
5. The portable livestock corral as recited in claim 1, wherein, the rearward end of said base frame is provided with a pair of double hinged entry gates.
6. The portable livestock corral as recited in claim 1 further comprising means for dividing said portable livestock corral into three separate confinement zones.

* * * * *